US012563333B2

(12) United States Patent
Wu et al.

(10) Patent No.: US 12,563,333 B2
(45) Date of Patent: Feb. 24, 2026

(54) HEAD-MOUNTABLE FRAME, HEAD-MOUNTABLE BLUETOOTH HEADPHONE, AND HELMET

(71) Applicant: GUANGDONG XIN QIAN CHAO INFORMATION TECHNOLOGY CO., LTD., Guangdong (CN)

(72) Inventors: Jifeng Wu, Shenzhen (CN); Jiyou Shao, Shenzhen (CN)

(73) Assignee: GUANGDONG XIN QIAN CHAO INFORMATION TECHNOLOGY CO., LTD., Shenzhen (CN)

(*) Notice: Subject to any disclaimer, the term of this patent is extended or adjusted under 35 U.S.C. 154(b) by 274 days.

(21) Appl. No.: 18/271,909

(22) PCT Filed: Jan. 17, 2022

(86) PCT No.: PCT/CN2022/072372

§ 371 (c)(1),
(2) Date: Jul. 12, 2023

(87) PCT Pub. No.: WO2022/152302

PCT Pub. Date: Jul. 21, 2022

(65) Prior Publication Data

US 2024/0305921 A1 Sep. 12, 2024

(30) Foreign Application Priority Data

Jan. 18, 2021 (CN) ......................... 202110062522.4

(51) Int. Cl.
*H04R 1/10* (2006.01)
*H04R 1/1025* (2026.01)

(52) U.S. Cl.
CPC ......... *H04R 1/1066* (2013.01); *H04R 1/1008* (2013.01); *H04R 1/1025* (2013.01);
(Continued)

(58) Field of Classification Search
CPC .. H04R 1/1066; H04R 1/1008; H04R 1/1025; H04R 1/1041; H04R 1/105; H04R 1/02;
(Continued)

(56) References Cited

U.S. PATENT DOCUMENTS 10,154,335 B1 * 12/2018 Hoang ................. H04R 1/1008
11,310,579 B2 * 4/2022 Lefebvre ................ H04R 5/033
(Continued)

FOREIGN PATENT DOCUMENTS

CN 101095370 A 12/2007
CN 206977645 U 2/2018
(Continued)

OTHER PUBLICATIONS

International Search Report from corresponding PCT Application No. PCT/CN2022/072372, Mar. 28, 2022.

*Primary Examiner* — Ahmad F. Matar
*Assistant Examiner* — Sabrina Diaz
(74) *Attorney, Agent, or Firm* — Workman Nydegger

(57) ABSTRACT

A head-mountable frame includes a frame body configured with an arcuate shape, and a pair of ear shells connected to both ends of the frame body, respectively. Each of the ear shells is provided with a receiving cavity for installing an earpiece module. The head-mountable frame includes an earmuff assembly provided on the inner side of each ear shell and configured to fit closely to an ear, thereby forming a closed sound transmission cavity between the earpiece module and the ear. The receiving cavity of the ear shell is configured to receive the earpiece module through press-in fit removably. A head-mountable Bluetooth headphone includes the head-mountable frame and a Bluetooth headphone module which can be removably mounted in the receiving cavity through a press-in fit. A helmet includes a
(Continued)

helmet body and a Bluetooth headphone module which can be removably mounted in the helmet body.

15 Claims, 9 Drawing Sheets

(52) U.S. Cl.
CPC ........... *H04R 1/1041* (2013.01); *H04R 1/105* (2013.01); *H04R 2420/07* (2013.01)

(58) Field of Classification Search
CPC .. H04R 2420/07; H04R 5/033; H04R 5/0335; H04R 9/06
USPC .................... 381/74, 87, 334, 370, 376, 182
See application file for complete search history.

(56) References Cited

U.S. PATENT DOCUMENTS

| | | | | |
|---|---|---|---|---|
| 2006/0147052 | A1 | 7/2006 | Wikel et al. | |
| 2009/0257615 | A1 | 10/2009 | Bayer, Jr. | |
| 2018/0332919 | A1 | 11/2018 | Garcia Mansilla et al. | |
| 2022/0086549 | A1* | 3/2022 | Hatfield | H04R 1/1066 |

FOREIGN PATENT DOCUMENTS

| | | | | | |
|---|---|---|---|---|---|
| CN | 108064449 | A | * | 5/2018 | H04R 1/10 |
| CN | 207443079 | U | | 6/2018 | |
| CN | 211128148 | U | * | 7/2020 | H04R 1/10 |
| CN | 214481174 | U | | 10/2021 | |
| CN | 214627314 | U | | 11/2021 | |
| CN | 215499485 | U | | 1/2022 | |

* cited by examiner

HEAD-MOUNTABLE FRAME, HEAD-MOUNTABLE BLUETOOTH HEADPHONE, AND HELMET

CROSS REFERENCE OF RELATED APPLICATION

The present application claims the priority of Chinese patent application No. 2021100625224, entitled "head-mountable frame, head-mountable Bluetooth headphone, and helmet" and filed on Jan. 18, 2021, the entire content of which is incorporated herein by reference.

TECHNICAL FIELD

The present invention relates to the technical field of electronic product, and in particular to a head-mountable frame, a Bluetooth headphone including the same, and a helmet.

TECHNICAL BACKGROUND

As communication technology advances by leaps and bounds, the use of headphone is becoming more and more widespread. With the development of the era, people increasingly rely on headphones, not only because they are transmitters of sound, but also because they offer the wearer an ability to be independent and create subjective reality. More importantly, as the sense of boundary between work and social life disappears, headphone becomes an important modern mediator for dividing private spaces from public spaces. With the continuous improvement of people's living standards, the use scenario of headphones extends from indoor to outdoor, which has increasingly higher requirements for the design, quality, convenience, and multiple use scenarios of headphones.

Existing head-mountable headphones include headphones having a fixed-frame, an adjustable-frame, a foldable-frame or the like. Just as its name implies, the fixed-frame headphone includes a head-mountable frame that has a fixed size and thus is non-adjustable. The head-mountable frame is formed as a unitary member, or has multiple parts fixed and assembled into one piece. When the headphone is put on a head, it is only necessary to pull two earpiece modules fixed on the frame away from each other, so that a clamping force will be generated to adjust the headphone automatically according to the size of the head, thus achieving a stable wear. However, since the fixed-frame headphone is relatively large, inconvenient to store and carry, and uncomfortable to wear, it is restricted in usage and difficult to be worn adaptively. Compared with the fixed-frame headphone, the adjustable-frame headphone is further provided with a structure for adjusting the size of the frame. Specifically, an adjustably stretchable structure is provided at each end of the frame connected to the earpiece module. When the headphone is put on, sliding arms on both sides are pulled according to the size of the head, so as to adjust the headphone to an appropriate size. The adjustable-frame headphone has a moderate size, which also suffers the problems of being inconvenient to store and carry and having limited use scenarios. The foldable-frame headphone has a head-mountable frame with an adjustable size, wherein the earpiece module together with its sliding arm can be folded up. The foldable-frame headphone can be put on with an operation the same as that of the adjustable-frame headphone. However, the foldable-frame headphone is expensive in production, and also has limited use scenario.

SUMMARY OF THE INVENTION

In view of the above technical problems, the present invention aims to propose a head-mountable frame, a Bluetooth headphone including the same, and a helmet. This head-mountable frame is applicable to a variety of use scenarios, and can be switched between different sound modes. With a simple structure, the head-mountable frame is flexible and convenient for use, and can be conveniently and quickly mounted on and removed from a Bluetooth headphone module.

For this purpose, a first aspect of the present invention proposes a head-mountable frame which comprises head-mountable frame body configured to have an arcuate shape, and a pair of ear shells connected to both end of the frame body, respectively, each of the ear shells being provided with a receiving cavity for installing an earpiece module. The head-mountable frame further comprises an earmuff assembly provided on an inner side of each ear shell and configured to fit closely to an ear, thereby forming a closed sound transmission cavity between the earpiece module and the ear, wherein the receiving cavity of the ear shell is configured to removably receive the earpiece module through press-in fit.

In one embodiment, the earmuff assembly comprises an earmuff support and an earmuff element mounted thereon.

In one embodiment, a plurality of rotary clamping studs is provided on the earmuff support, and a plurality of rotary clamping slots is provided on an inner wall of the receiving cavity, wherein each of the rotary clamping studs is configured to fit in a respective one of the rotary clamping slots, thereby forming a connection between the earmuff assembly and the ear shell, and limiting movement of the earpiece module.

In one embodiment, the plurality of rotary clamping studs is distributed evenly along a circumferential direction on an outer circumferential surface of the earmuff support.

In one embodiment, the earmuff support is provided with at least one first magnet, and the ear shell is provided with at least one second magnet, wherein the first magnet is configured to attract the second magnet so that the earmuff assembly is connected to the ear shell.

In one embodiment, the first magnet is embedded in an end surface of the earmuff support that engages with the ear shell, and the second magnet is embedded in an end surface of the ear shell that engages with the earmuff support.

In one embodiment, a plurality of first magnets and a plurality of second magnets are provided to be distributed evenly at a certain distance along a circumferential direction, respectively, wherein each of the second magnets is configured to correspond to a respective one of the first magnets.

In one embodiment, the earmuff assembly further comprises an annular seal arranged between the earmuff support and the receiving cavity.

In one embodiment, the ear shell comprises an ear shell rear cover and an ear shell front cover provided on an inner side of the ear shell rear cover, wherein a through hole is formed on a side wall of the ear shell rear cover, for engageably receiving a charging port of the earpiece module.

In one embodiment, the through hole is configured to be offset from the frame body at an angle of 90° or 180° along a circumferential direction of the ear shell.

In one embodiment, an annular foam element is provided between the ear shell and the earmuff assembly.

In one embodiment, the ear shell is connected to the frame body through a sliding ear arm, which is configured to be extendable and retractable along an extension direction of the frame body.

In one embodiment, the sliding ear arm comprises a sliding outer cover and a sliding inner cover, wherein a first end of the sliding ear arm is formed as an annular mounting portion for the ear shell, and a second end thereof is configured to connect with the frame body through a sliding arm.

In one embodiment, the sliding arm is arranged between the sliding outer cover and the sliding inner cover, wherein one end portion of the sliding arm is configured to extend out of the sliding ear arm to fixedly connect with the frame body. A plurality of limiting grooves is provided on an inner wall surface of the sliding inner cover, and the sliding arm is provided with a sliding spring sheet thereon, so that the sliding ear arm is adjustable to extend and retract along the extension direction of frame body to be engageably received in a respective one of the limiting grooves through the sliding spring sheet, thereby restricting a position of the sliding ear arm.

In one embodiment, the frame body comprises a head-mountable shell and a head-mountable pad provided on an inner side of the head-mountable shell, wherein the head-mountable pad is connected to the head-mountable shell through a pad support.

In one embodiment, a sponge layer is provided between the head-mountable pad and the pad support.

In one embodiment, an elastic clamping jaw is provided in the receiving cavity for engagement with earpiece modules with different sizes.

In one embodiment, the receiving cavity is configured as a through hole, and has a mounting stop flange formed on an outer side thereof.

A second aspect of the present invention discloses a head-mountable Bluetooth headphone, which comprises the head-mountable frame and a Bluetooth headphone module comprising a pair of earpiece modules, wherein each of the earpiece modules is removably mounted in a corresponding receiving cavity of the ear shell through press-in fit.

In one embodiment, each of the earpiece modules comprises an earpiece housing, in which a sounding assembly and a circuit board assembly are provided, and a charging port formed on the earpiece housing, wherein one end of the charging port is configured to connect with the circuit board assembly, and another end thereof is configured to extend out of the earpiece housing.

In one embodiment, the charging port is mounted in the through hole of the ear shell to position the earpiece module.

In one embodiment, the pair of earpiece modules is connected to each other through a connection cable, or in a wireless manner.

A third aspect of the present invention discloses a helmet which comprises a helmet body, a Bluetooth headphone module comprising a pair of earpiece modules, and an ear protector and a mounting slot provided on each side of the helmet body, wherein the ear protector is provided with an ear-protector fixing plate, through which the ear protector is engageably received in the mounting slot, wherein the ear protector is provided with a mounting space in which a respective earpiece module of the Bluetooth headphone is removably mounted through press-in fit.

In one embodiment, the helmet is a ski helmet.

Compared with the prior arts, the present application has the following advantages.

The Bluetooth headphone module according to the present invention can be removably mounted in a head-mountable device, such as a head-mountable frame, a helmet or the like, thus is applicable to a variety of use scenarios such as commuting, outdoor sports and so on. The Bluetooth headphone module can achieve the switching between different sound modes, and has a simple structure that facilitates convenient and quick installation and detachment, as well as flexible and convenient use. Through the head-mountable frame and the helmet with simple structures according to the present invention, the quick installation and detachment of the Bluetooth headphone module can be achieved. In addition, the sound effect of the Bluetooth headphone module can be ensured, and the wiring can be facilitated, avoiding the connection cable from being messy and providing protection for the connection cable. Moreover, the head-mountable frame is easy to adjust and can adapt to the head shape of the wearer, thus improving the comfortableness when being worn.

BRIEF DESCRIPTION OF THE DRAWINGS

The present invention will be described below with reference to the accompanying drawings.

In the present application, all accompanying drawings are schematic ones, provided to illustrate the principle of the present invention merely, and are not necessarily drawn to actual scale.

DETAILED DESCRIPTION OF EMBODIMENTS

The present invention will be further described below with reference to the accompanying drawings.

Figure 1:
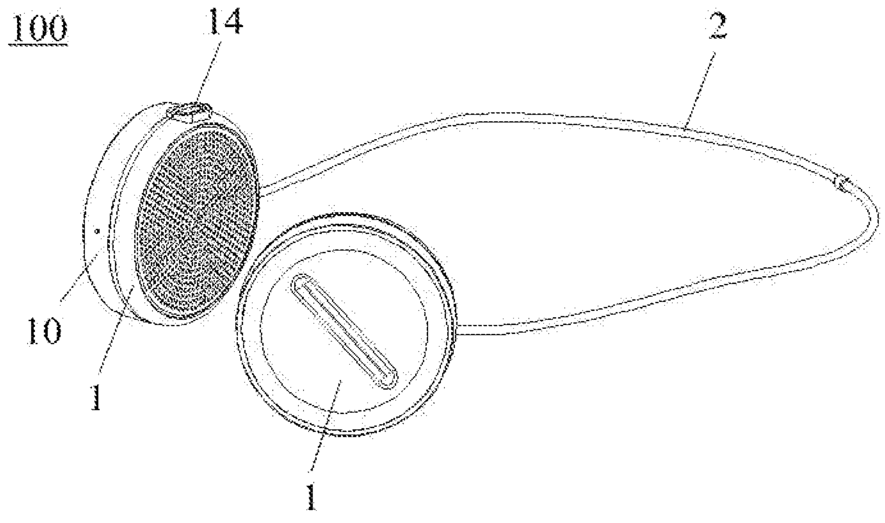
FIG. 1 shows the structure of a Bluetooth headphone module of a Bluetooth headphone according to the present invention.
Figure 2:
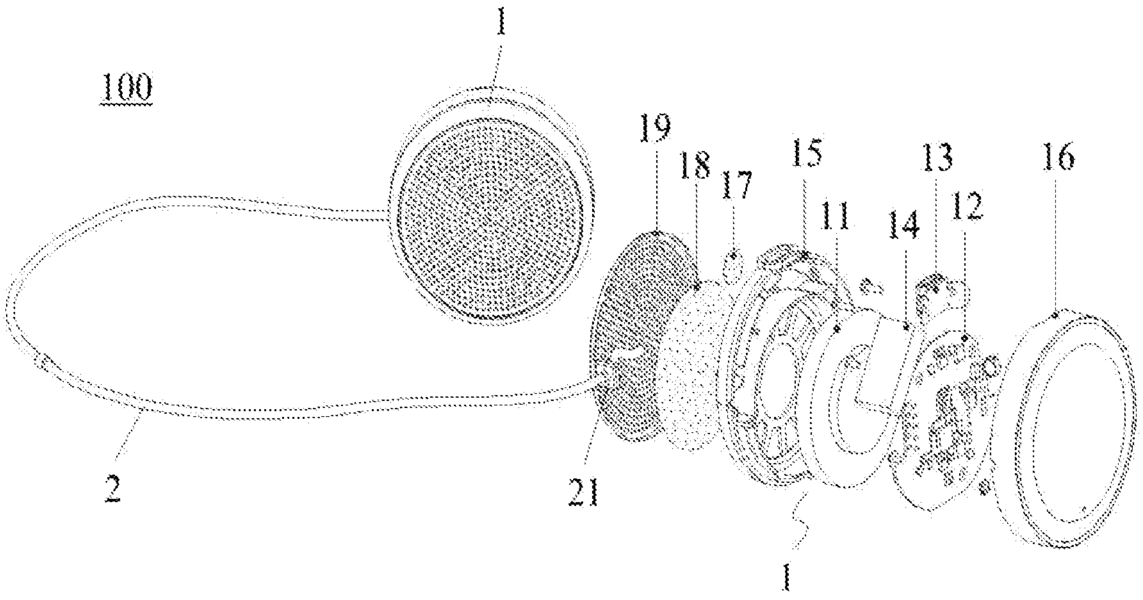
FIG. 2 is an exploded view of an earpiece module in the Bluetooth headphone module as shown in FIG. 1.

FIG. 1 shows the structure of a Bluetooth headphone module 100 according to the present invention. As shown in FIG. 1, the Bluetooth headphone module 100 comprises a pair of earpiece modules 1. As shown in FIG. 2, each of the two earpiece modules comprises a cylindrical earpiece housing 10, which is provided therein with a sounding assembly 11 (such as a speaker), a circuit board assembly 12, a battery 14, and other components. The earpiece housing 10 comprises a front cover 15 and a rear cover 16, which can be pressed to engage with each other to form the earpiece housing 10. A mounting space is formed between the front cover 15 and the rear cover 16, for arranging the sounding assembly 11, the circuit board assembly 12, the battery 14 and other components. A bottom portion of the front cover 15 is hollowed out, for transmission of the sound emitted from the sounding assembly 11. A speaker mesh cover 19 is further provided on an outer side of the front cover 15, and a dustproof mesh 18 and a tuning paper 17 are provided between the speaker mesh cover 19 and the front cover 15.

According to an embodiment of the present invention, the earpiece modules 1 are connected to each other by a connection cable 2. Each end of the connection cable 2 is connected to a respective earpiece module 1 through a terminal 21. Preferably, the terminal 21 is provided inside the earpiece housing 10. The connection cable 2 is connected to the terminal 21 after passing through the earpiece housing 10, and thus connected to the circuit board assembly 12 in the earpiece housing 10.

Figure 9:
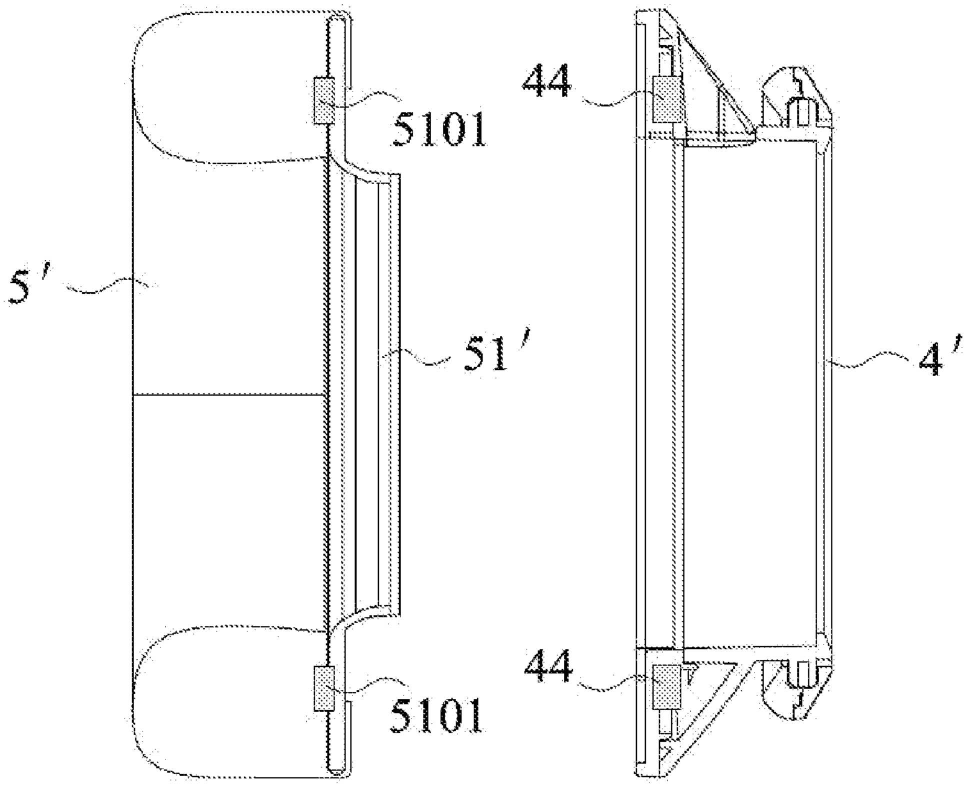

In one embodiment, as shown in FIG. 9, a pair of earpiece modules 1' can also be configured as two separate elements, which are connected to each other wirelessly.

According to the present invention, the earpiece module 1 is provided with a charging port 13 for electrical charging. The charging port 13 is provided on a side wall of the earpiece housing 10 of the earpiece module 1. One end of the charging port 13 is connected to the circuit board assembly 12, and the other end thereof extends out of the earpiece housing 10 after passing through the side wall of the earpiece housing 10. The charging port 13 is configured to be offset from the terminal 21 with an angle of 90° or 180° along a circumferential direction of the earpiece housing 10, whereby it can avoid the interference between the connection cable 2 and the charging port 13 during charging, and thus is beneficial for the charging.

Figure 3:
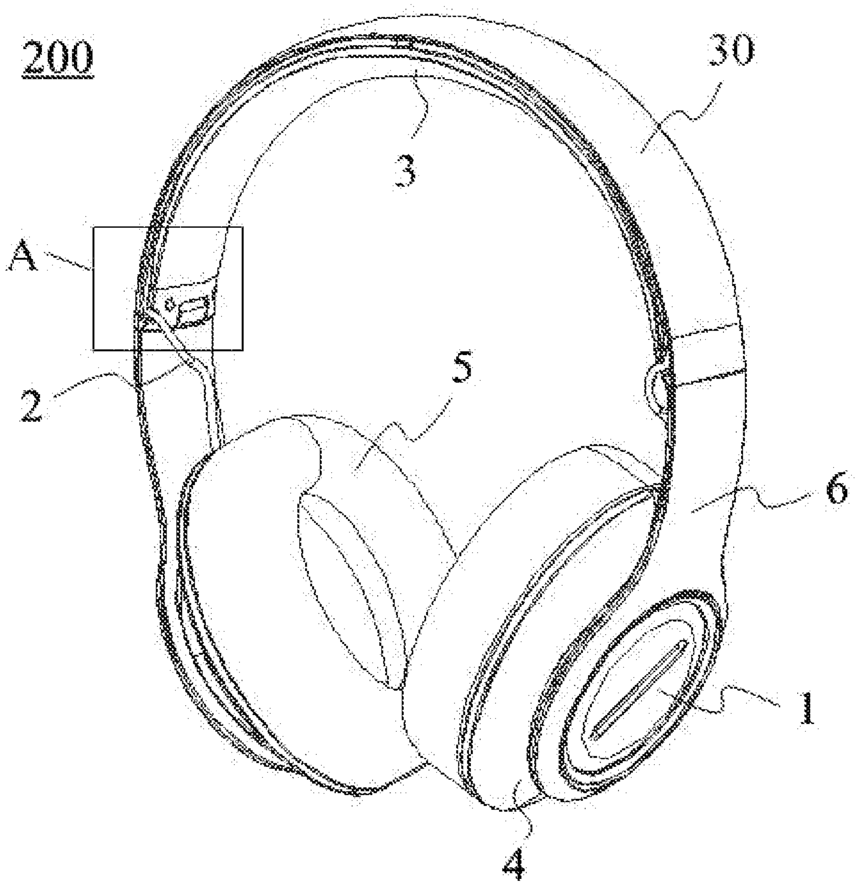
FIG. 3 shows the structure of the Bluetooth headphone according to the present invention.

The present invention further provides a head-mountable Bluetooth headphone 200. As shown in FIG. 3, the head-mountable Bluetooth headphone 200 comprises a head-mountable frame 30, and a Bluetooth headphone module 100 according to the present invention. According to the present invention, the head-mountable frame 30 includes an arcuate frame body 3, with an ear shell 4 attached to each end thereof. Each ear shell 4 is provided with a receiving cavity 40 (see FIG. 4), for installing the earpiece module 1 therein. The earpiece module 1 of the Bluetooth headphone module 100 is removably installed in the receiving cavity 40 of the corresponding ear shell 4 through press-in fit. An earmuff assembly 5 is provided at an inner side of each ear shell 4, and configured to fit closely to the ear, thus forming a closed sound transmission cavity between the earpiece module 1 and the ear. Thus, the ear shell 4, the Bluetooth headphone module 100 and the earmuff assembly 5 together form a headphone unit. It should be noted that in this context, the term "inner side" refers to a side of the ear shell 4 near the ear when the Bluetooth headphone 200 according to the present invention is put on, and the term "outer side" refers to a side of the ear shell 4 away from the ear.

Figure 4:
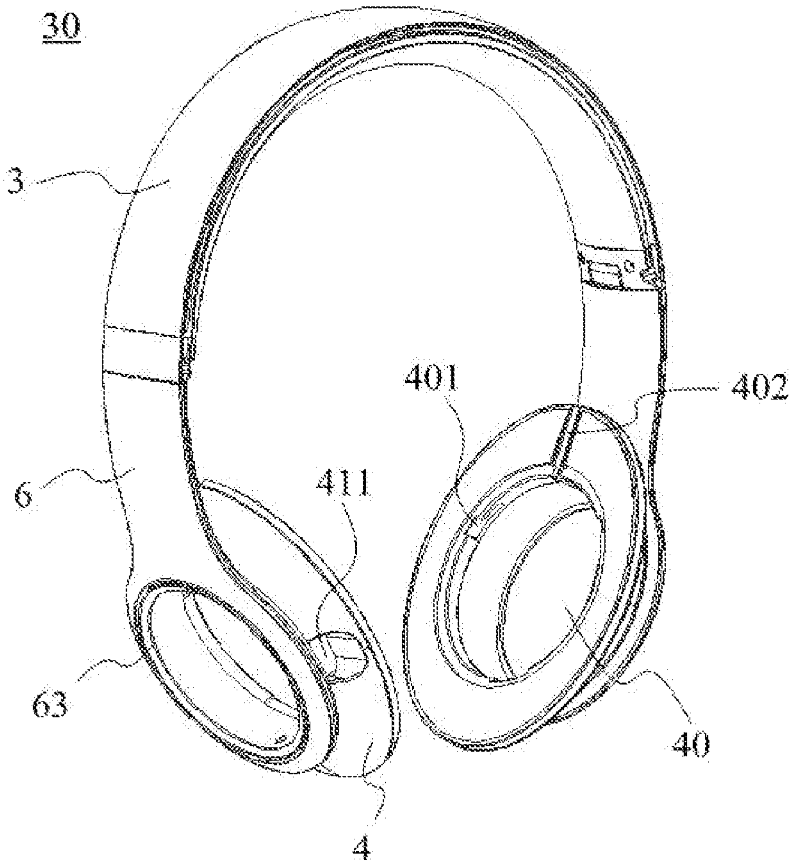
FIG. 4 shows the structure of a head-mountable frame in the Bluetooth headphone as shown in FIG. 3.

As shown in FIG. 4, the ear shell 4 is connected to an end of the frame body 3 through a sliding ear arm 6, which is configured to be extendable and retractable along an extension direction of the frame body 3, so as to adjust the extension length of the headphone unit along the extension direction of the frame body 3. In this manner, the head-mountable Bluetooth headphone 200 can be adapted to different wearers. A first end of the sliding ear arm 6 is formed as an annular mounting portion 63 for the ear shell 4, which can be fixedly connected thereto, for example, by snap-fit or by using a fastener. A second end of the sliding ear arm 6 is connected to the end of the frame body 3.

Figure 5:
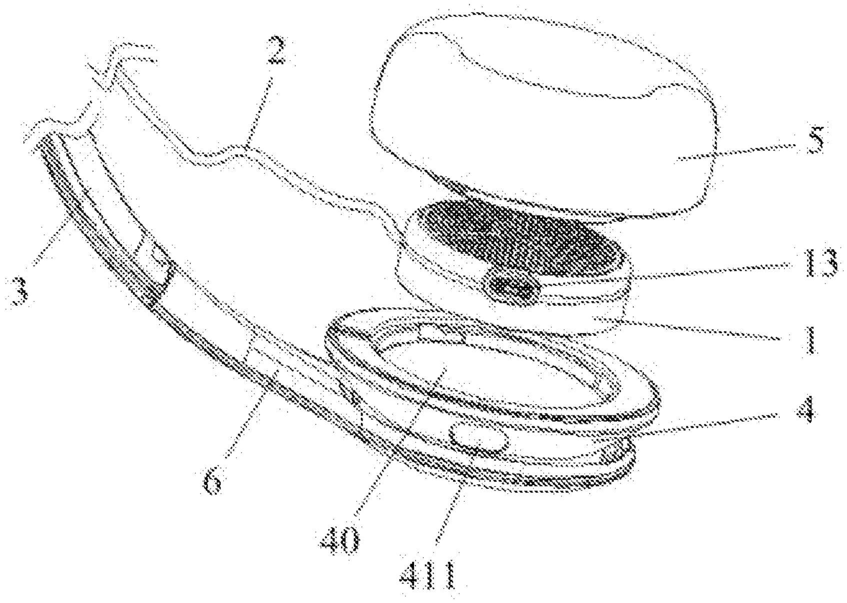
FIG. 5 is a view showing how to assemble the Bluetooth headphone as shown in FIG. 3.

As shown in FIGS. 4 and 5, a side wall of the ear shell 4 is provided with a through hole 411, for engageably receiving the charging port 13 of a corresponding earpiece housing. The through hole 411 is configured to be offset from the frame body 3 with an angle of 90° or 180° along the circumferential direction of the ear shell 4. When the earpiece module 1 is installed, the charging port 13 of the earpiece housing 10 passes through the corresponding through hole 411 on the side wall of the ear shell 4, thus achieving engageable installation. The through hole 411 can also function as a limit to the charging port 13 of the earpiece module 1, thereby positioning the earpiece module 1 for installation.

In order to facilitate the installation of the connection cable 2, the ear shell 4 is provided with a radial channel 402. When the earpiece module 1 is installed in the receiving cavity 40 of the ear shell 4, the connection cable 2 is arranged in the radial channel 402 and leads out therefrom, and thus is further arranged in the frame body 3. The radial channel 402 is configured to be offset from the through hole 411 on the side wall of the ear shell 4 along the circumferential direction, with an offset angle being the same as that formed between the charging port 13 and the corresponding terminal 21. Further, the radial channel 402 is arranged at a circumferential position corresponding to the sliding ear arm 6, so as to facilitate the arrangement of the connection cable 2, which is guided out of the ear shell 4 along the extension direction of the frame body 3.

Figure 6:
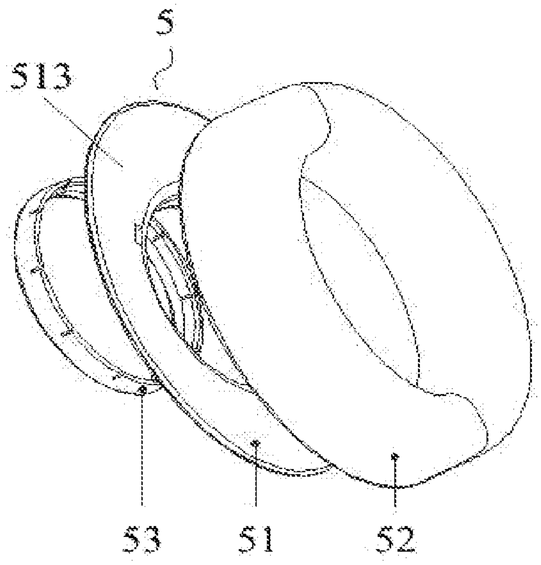
FIG. 6 shows the structure of an earmuff assembly of the Bluetooth headphone as shown in FIG. 3.
Figure 7:
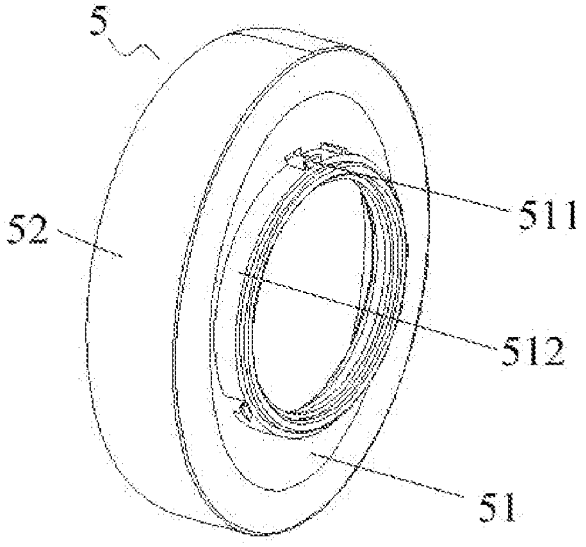
FIG. 7 shows the structure of an earmuff support of the earmuff assembly as shown in FIG. 6.

FIGS. 6 and 7 show the structure of the earmuff assembly 5. As shown in FIGS. 6 and 7, the earmuff assembly 5 includes an earmuff support 51 and an earmuff element 52 mounted thereon. The earmuff support 51 is configured to include a cylindrical earmuff body 512 and an earmuff mounting plate 513 fixed to one end thereof. The earmuff mounting plate 513 is formed as an annular plate extending outward along a radial direction of the earmuff body 512. The earmuff element 52 is fixedly mounted on an inner end surface of the earmuff mounting plate 513, for example, by adhesive.

According to an embodiment of the present invention, a plurality of rotary clamping studs 511 is distributed evenly along the circumferential direction on an outer circumferential surface of the earmuff support 51. As shown in FIG. 7, the plurality of rotary clamping studs 511 is distributed evenly along the circumferential direction on an outer wall surface of the earmuff body 512. The rotary clamping stud 511 can be configured, for example, as a protrusion extending outward along the radial direction of the earmuff body 512. At the same time, a plurality of rotary clamping slots 401 is evenly distributed along the circumferential direction on an inner wall surface of the receiving cavity 40 of the ear shell 4, as shown in FIG. 4. The rotary clamping studs 511 can each fit in a corresponding one of the rotary clamping slots 401, so that the earmuff assembly 5 can be attached to the ear shell 4. In one embodiment, the rotary clamping slot 401 is configured to include a first slot extending axially along the receiving cavity 40 and a second slot extending circumferentially along the receiving cavity 40, wherein the first slot and the second slot are in communication with each other. During installation, the rotary clamping stud 511 first fit in the first slot of the rotary clamping slot 401, and then fit in the second slot thereof after rotation, so that the earmuff assembly 5 can be mounted on the ear shell 4 in a snap-in manner. At the same time, the earmuff assembly 5 will press against the earpiece module 1, thus limiting the movement of the earpiece module 1.

Figure 8:
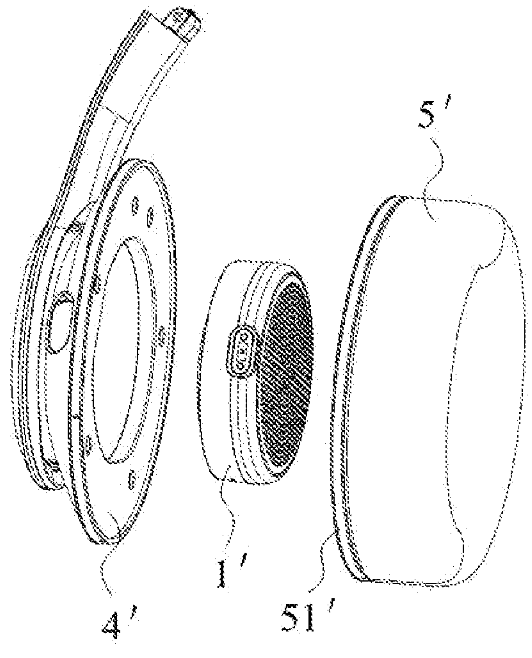
FIGS. 8 and 9 schematically show a connection between the earmuff support and an ear shell.

According to another embodiment of the present invention, as shown in FIGS. 8 and 9, the earmuff support 51' is provided with at least one first magnet 5101, and the ear shell 4' is provided with at least one second magnet 44, wherein the first magnet 5101 is able to attract the second magnet 44, so that the earmuff assembly 5' is connected to the ear shell 4' through magnetic attraction. Preferably, the first magnet 5101 is embedded in an end surface of the earmuff support 51' that engages with the ear shell 4', and the second magnet 44 is embedded in an end surface of the ear shell 4' that engages with the earmuff support 51'.

In one embodiment, a plurality of first magnets 5101 is provided to be evenly distributed at a certain distance on the earmuff support 51' along the circumferential direction thereof. Similarly, a plurality of second magnets 44 is provided to be evenly distributed at a certain distance on the ear shell 4' along the circumferential direction thereof. Each of the first magnets 5101 corresponds to and thus can attract with a respective ones of the second magnets 44.

Of course, the first magnets 5101 and the second magnets 44 can be configured to have annular structures of the same size, for being embedded in the earmuff support 51' and the ear shell 4', respectively.

As shown in FIG. 6, the earmuff assembly 5 further comprises an annular seal 53 arranged between the earmuff support 51 and the receiving cavity 40. The annular seal 53 can effectively ensure the sealing effect between the earmuff assembly 5 and the receiving cavity 40. In this manner, not only can the sound transmission effect of the head-mountable Bluetooth headphone 200 be improved, but also external noise can be avoided, which is rather conducive to enhancing the sound performance of the head-mountable Bluetooth headphone 200.

In one embodiment, a diameter of the earpiece housing 10 of the earpiece module 1 of the Bluetooth headphone module 100 is slightly larger than an inner diameter of the receiving cavity 40 of the ear shell 4. The receiving cavity 40 is shaped as a through hole passing through the ear shell 4. A mounting stop flange (not shown) is provided on an outer side of the receiving cavity 40, for positioning the earpiece module 1. In use, the earpiece module 1 of the Bluetooth headphone module 100 is removably mounted into the receiving cavity 40 of a corresponding ear shell 4 through press-in fit. Hence, the Bluetooth headphone module 100 can be quickly installed in the ear shell 4. The earmuff assembly 5 can be further connected to the ear shell 4 in a snap-in manner through engagements of the rotary clamping studs 511 with the rotary clamping slots 401 in the receiving cavity 40. The earmuff assembly 5 can also press against the earpiece module 1, thus limiting the movement of the earpiece module 1 and ensuring a stable installation thereof. When the Bluetooth headphone module 100 needs to be removed, the earmuff assembly 5 is rotated so that the rotary clamping studs 511 are disengaged from the rotary clamping slots 401. In this case, the earmuff assembly 5 can be removed, and then the earpiece module 1 can be pushed out from the receiving cavity 40. In this manner, the earpiece module 1 can be easily removed. Accordingly, the simple structure of the head-mountable frame 30 can facilitate the quick and convenient installation and detachment of the Bluetooth headphone module 100. At the same time, the Bluetooth headphone module 100 can be applied to a variety of use scenarios, and thus has wide applicability.

In an embodiment not shown, an elastic clamping jaw is provided in the receiving cavity 40 for engagement with earpiece modules 1 with different sizes, which allows the head-mountable frame 30 to be adapted to earpiece modules 1 with a variety of different sizes, improving the applicability of the head-mountable frame 30.

Figure 10:
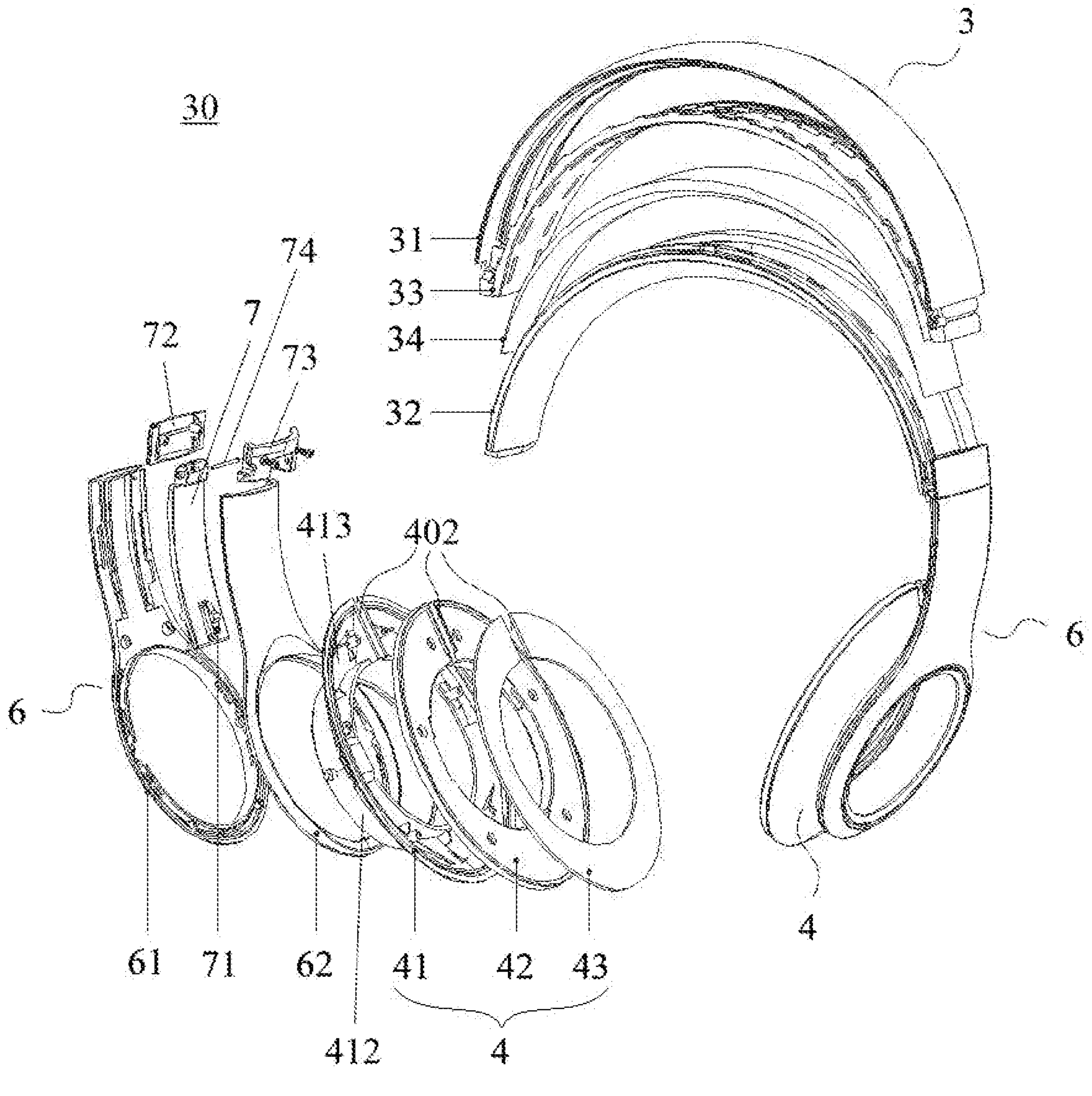
FIG. 10 is an exploded view of the head-mountable frame as shown in FIG. 4.

FIG. 10 shows the structure of the head-mountable frame 30 in detail. As shown in FIG. 10, the ear shell 4 of the head-mountable frame 30 includes an ear shell rear cover 41 and an ear shell front cover 42, wherein the ear shell front cover 42 is provided on an inner side of the ear shell rear cover 41. The through hole 411 for mounting the charging port 13 of the earpiece housing is provided on a side wall of the corresponding ear shell rear cover 41. The ear shell rear cover 41 is configured to include a cylindrical first portion 412, and a second portion 413 fixedly attached to one end of the first portion 412, with the second portion 413 having an annular plate-like structure. The through hole 411 is formed on the first portion 412. The rotary clamping slots 401 are provided on an inner wall surface of the first portion 412, and offset with the through hole 411 in the circumferential direction. The ear shell front cover 42 has an annular plate-like structure. In one embodiment, the ear shell rear cover 41 and the ear shell front cover 42 can, for example, be connected into one piece through bolt fasteners. Of course, the ear shell rear cover 41 and the ear shell front cover 42 can also be connected with each other through press-in fit, or the like.

In order to ensure the sealing performance between the earmuff assembly 5 and the ear shell 4, an annular foam element 43 is provided therebetween. The foam element 43, which has a shape adapted to the ear shell front cover 42, is provided on an inner side surface of the ear shell front cover 42. During installation, the foam element 43 is arranged between the ear shell front cover 42 and the earmuff element 52, which can effectively ensure the sealing performance therebetween, thus effectively avoiding sound leakage and further enhancing the sound performance of the head-mountable Bluetooth headphone 200.

According to one embodiment of the present invention, the radial channel 402 is provided in each of the ear shell rear cover 41, the ear shell front cover 42 and the foam element 43, as shown in FIG. 10. In addition, the radial channels 402 are configured to align with each other in the circumferential direction, for arrangement of the connection cable 2 therein.

As shown in FIG. 10, the ear shell 4 is connected to the end of the frame body 3 through the sliding ear arm 6, which comprises a sliding outer cover 61 and a sliding inner cover 62 that can be connected into one piece through, for example, bolt fasteners. Of course, the sliding outer cover 61 and the sliding inner cover 62 can also be connected together through press-in fit, or the like. A first end of the sliding ear arm 6 is formed as an annular mounting portion 63 for mounting the ear shell 4, and the ear shell rear cover 41 of the ear shell 4 is adapted to and fixedly connected to the annular mounting portion 63. A second end of the sliding ear arm 6 is connected to the frame body 3 through the sliding arm 7. An ear arm space is formed between the sliding outer cover 61 and the sliding inner cover 62, for the sliding arm 7 to slide therein. The sliding arm 7 is arranged in the ear arm space, with one end thereof extending out of the sliding ear arm 6 to be fixedly connected to the end of the frame body 3.

According to one embodiment of the present invention, a plurality of limiting grooves (not shown) is provided on an inner wall surface of the sliding inner cover 62. The sliding arm 7 is provided with a sliding spring sheet 71, which can engage with a respective one of the limiting grooves. The sliding ear arm 6 can be extended or retracted along the extension direction of the frame body 3, so as to engage with one of the limiting grooves through the sliding spring sheet 71, thereby restricting the position of the sliding ear arm 6. Thus, the sliding ear arm 6 can be adjusted in an extensible and retractable manner.

According to the present invention, the frame body 3 of the head-mountable frame 30 comprises a head-mountable shell 31, and a head-mountable pad 32 provided on an inner side of the head-mountable shell 31, as shown in FIG. 10. The head-mountable pad 32 is connected to the head-mountable shell 31 through a pad support 33. The head-mountable pad 32 can be connected with the pad support 33 into one piece through adhesive or snap-in fit. The head-mountable shell 31, the head-mountable pad 32 and the pad support 33 are each configured to have an arcuate structure, which enables the frame body 3 of the head-mountable Bluetooth headphone 200 to better fit with the head of the wearer in use. In one embodiment, for example, a slot (not shown) can be provided on an inner side surface of the head-mountable shell 31, and a snap (not shown) can be provided on an outer side surface of the pad support 33, so that the pad support 33 can be connected to the head-mountable shell 31 by engagement of the snap with the slot. Of course, the positions of the slot and the snap can be exchanged. In other embodiments, the head-mountable shell 31 and the pad support 33 can be fixedly connected with each other through adhesive, or fasteners such as screws or bolts.

In addition, a sponge layer 34 can be further provided between the head-mountable pad 32 and the pad support 33. The sponge layer 34 contributes to comfortableness and softness of the head-mountable pad 32, thus can be very conducive to improving comfortableness when the head-mountable Bluetooth headphone 200 is worn.

Figure 11:
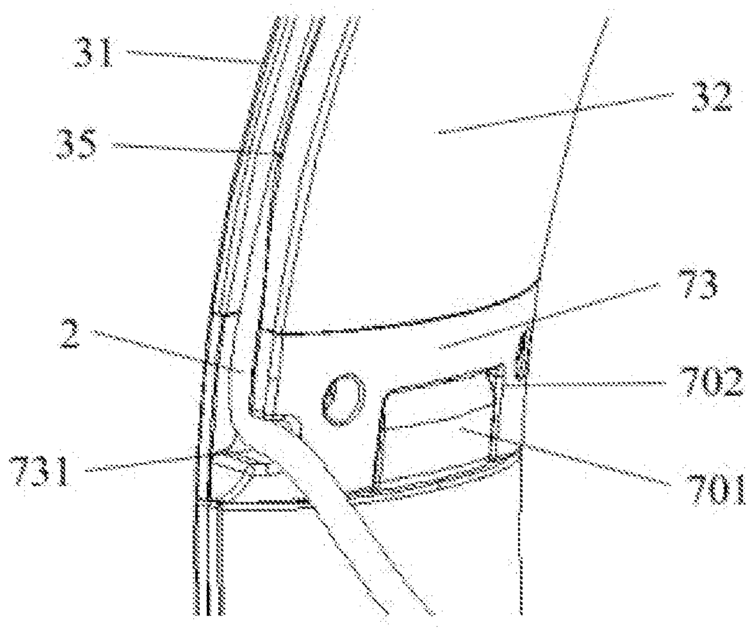
FIG. 11 is a close-up view of area A as shown in FIG. 3.

According to the present invention, an end of the sliding arm 7 extending out of the sliding ear arm 6 is fixedly connected to an end of the head-mountable shell 31 of the frame body 3. A sliding arm outer cover 72 and a sliding arm inner cover 73, which are provided at a connection between the sliding arm 7 and the head-mountable shell 31, can be secured together through snap-in fit or bolt fasteners, and further fixedly connected to the end of the frame body 3. In one embodiment, the end of the sliding arm 7 is fixedly connected to the sliding arm inner cover 73 through an elastic pin 74 made of memory material. As shown in FIG. 11, a convex mounting portion 701 protruding along the length direction is provided at the end of the sliding arm 7. A first mounting hole passing through the width direction is provided on the convex mounting portion 701. Meanwhile, a concave mounting portion 702 recessed along the length direction is provided at an end of the sliding arm inner cover 73. A second mounting hole extending along the width direction is further provided on the concave mounting portion 702. The convex mounting portion 701 at the end of the sliding arm 7 is engageably arranged in the concave mounting portion 702 at the end portion of the sliding arm inner cover 73, wherein the first mounting hole aligns with the second mounting hole. After passing the elastic pin 74 through the second mounting hole and the first mounting hole in sequence, the sliding arm 7 can be fixedly connected to the sliding arm inner cover 73.

In one embodiment, a wiring gap 35 is further formed between the head-mountable pad 32 and the head-mountable shell 31, in order to facilitate the arrangement of the connection cable 2 of the Bluetooth headphone module 100. The wiring gap 35 is formed outside of the pad support 33 in the width direction, extending to a position between the sliding arm outer cover 72 and the sliding arm inner cover 73 along the extension direction of the frame body 3. The sliding arm inner cover 73 is further provided with a guide slot 731 therein, which is in communication with the wiring gap 35. After led out from the radial channel 402 of the ear shell 4, the connection cable 2 of the Bluetooth headphone module 100 is installed in the wiring gap 35 through the guide slot 731, thereby completing the wiring of the connection cable 2. This not only facilitates the quick and convenient arrangement of the connection cable 2, but also effectively avoids the connection cable 2 from being messy with a protection for the connection cable 2.

With the head-mountable Bluetooth headphone 200 according to the present invention, the Bluetooth headphone module 100 can be mounted in the head-mountable frame 30, thereby achieving the application in the urban commuting scenario. The head-mountable frame 30 has a simple structure and can be flexibly adjusted, thus achieving convenient and quick installation and detachment of the Bluetooth headphone module 100.

Figure 12:
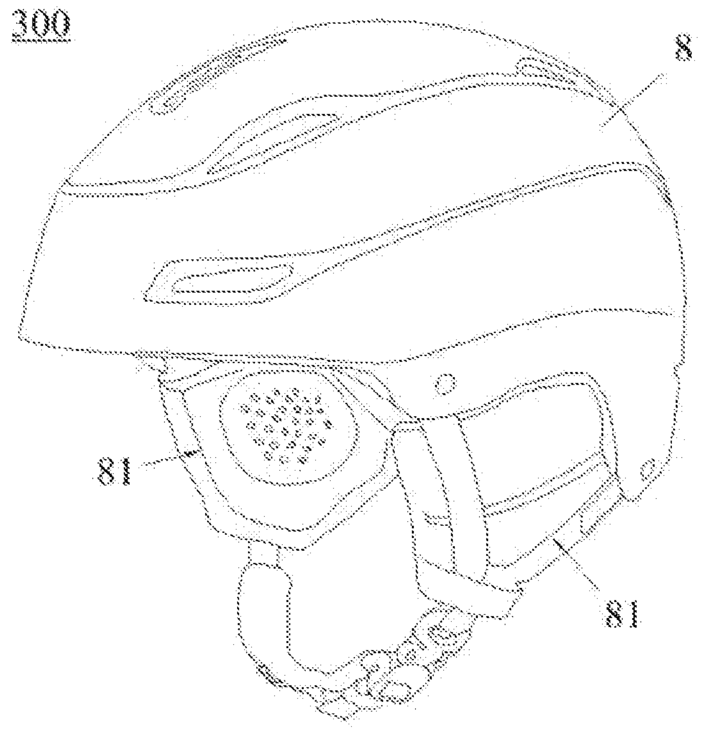
FIG. 12 schematically shows the position of the Bluetooth headphone module mounted in a helmet.

The present invention further provides a helmet 300. In the following a ski helmet will be discussed as an example. The helmet 300 includes a Bluetooth headphone module 100 according to the present invention, which can be removably mounted therein. As shown in FIG. 12, the helmet 300 includes a helmet body 8 with an ear protector 81 provided on each side thereof. The ear protector 81 is formed therein with a mounting space for the Bluetooth headphone module 100. Each earpiece module 1 of the Bluetooth headphone module 100 can be removably installed in a respective mounting space through pressing-in fit.

Figure 13:
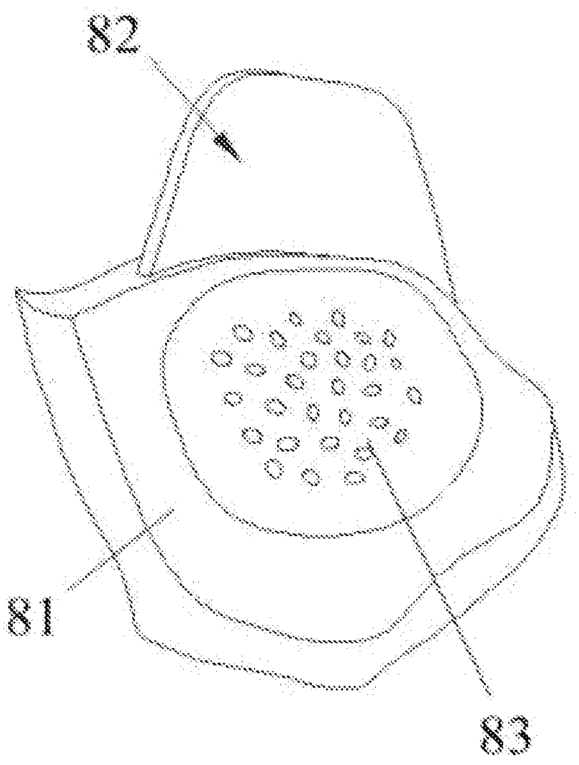
FIG. 13 schematically shows the structure of an ear protector of the helmet as shown in FIG. 12.

In one embodiment, a mounting slot (not shown) is provided on each side of the helmet body 8. As shown in FIG. 13, the ear protector 81 is provided with an ear-protector fixing plate 82, through which the ear protector 81 can be engageably received in the mounting slot, thereby mounting the ear protector 81 in the helmet body 8. Thus, the Bluetooth headphone module 100 can be mounted on the helmet 300. The connection cable 2 of the earpiece modules 1 is arranged in a canvas crack on an inner side of the helmet 300. Therefore, the Bluetooth headphone module 100 can be mounted in the ski helmet for outdoor skiing scenario. The helmet 300 has a simple structure, which can achieve the convenient and quick installation and detachment of the Bluetooth headphone module 100 and thus is suitable for different scenarios.

According to the present invention, the helmet 300 can be used according to actual needs. In some embodiments, the helmet 300 can be used, for example, as a ski helmet, snowboarding helmet, mountaineering helmet, motorcycle helmet, safety helmet for construction, racing helmet, bicycle helmet, military and other tactical helmet, fire helmet, safety helmet, rescue helmet, welding helmet, or the like.

The Bluetooth headphone module 100 according to the present invention can be removably mounted in a head-mountable frame, a helmet or other head-mountable devices, thus is applicable to a variety of use scenarios such as commuting, outdoor sports and so on. The Bluetooth headphone module 100 can achieve the switching between different sound modes, and has a simple structure that facilitates convenient and quick installation and detachment, as well as flexible and convenient use. Through the head-mountable frame 30 and the helmet 300 with simple structures according to the present invention, the quick installation and detachment of Bluetooth headphone module 100 can be achieved. In addition, the sound effect of Bluetooth headphone module 100 can be ensured, and the wiring can be facilitated, avoiding the connection cable 2 from being messy and providing protection for the connection cable 2. Moreover, the head-mountable frame 30 is easy to adjust and can adapt to the head shape of the wearer, thus improving the comfortableness when being worn.

It should be noted that, as used herein, each of the terms "include", "comprise", "contain" or the like, and linguistic or grammatical variants, derivatives and/or cognates thereof means "include but not limited to".

It should be understood that all technical and scientific words, terms and/or expressions used throughout the present disclosure have the same or similar meaning as commonly understood by one skilled in the art, unless otherwise specifically explained or defined herein. The words, terminologies and symbols used throughout the present disclosure are for the purpose of description only, rather than being construed as any restriction.

Finally, it be should noted that the foregoing description is merely illustrative of preferred embodiments of the present invention, and is not intended to restrict the present invention. Although the present invention is described in detail with reference to the above embodiments, it is still possible for one skilled in the art to modify the technical solutions defined in the above embodiments or to replace some of the technical features with equivalent ones. Any modifications, equivalent substitutions, improvements, and the like falling within the spirit and principles of the present invention are intended to be included within the scope of protection of the present invention.

The invention claimed is:

1. A head-mountable frame, comprising:

a frame body configured to have an arcuate shape;

a pair of ear shells connected to both ends of the frame body, respectively, each of the ear shells being provided with a receiving cavity for installing an earpiece module; and an earmuff assembly, provided on an inner side of each ear shell and configured to fit closely to an ear, thereby forming a closed sound transmission cavity between the earpiece module and the ear, the earmuff assembly comprising an earmuff support and an earmuff element mounted thereon, wherein the receiving cavity of the ear shell is configured to removably receive the earpiece module through press-in fit, wherein the earmuff support includes a cylindrical earmuff body and an earmuff mounting plate fixed to one end of the earmuff body, wherein a plurality of rotary clamping studs is provided on an outer wall surface of the earmuff body, and a plurality of rotary clamping slots is provided on an inner wall of the receiving cavity, wherein each of the rotary clamping studs is configured to fit in a respective one of the rotary clamping slots when the earmuff body is inserted into the receiving cavity, thereby forming a connection between the earmuff assembly and the ear shell and limiting movement of the earpiece module in the receiving cavity, and wherein the earmuff assembly further comprises an annular seal arranged between the earmuff support and the receiving cavity.

2. The head-mountable frame according to claim 1, wherein the plurality of rotary clamping studs is distributed evenly along a circumferential direction on an outer circumferential surface of the earmuff support.

3. The head-mountable frame according to claim 1, wherein the ear shell comprises an ear shell rear cover and an ear shell front cover provided on an inner side of the ear shell rear cover, wherein a through hole is formed on a side wall of the ear shell rear cover, for engageably receiving a charging port of the earpiece module.

4. The head-mountable frame according to claim 3, wherein the through hole is configured to be offset from the frame body at an angle of 90° or 180° along a circumferential direction of the ear shell.

5. The head-mountable frame according to claim 1, wherein an annular foam element is provided between the ear shell and the earmuff assembly.

6. The head-mountable frame according to claim 1, wherein the ear shell is connected to the frame body through a sliding ear arm, which is configured to be extendable and retractable along an extension direction of the frame body.

7. The head-mountable frame according to claim 6, wherein the sliding ear arm comprises a sliding outer cover and a sliding inner cover, wherein a first end of the sliding ear arm is formed as an annular mounting portion for the ear shell, and a second end thereof is configured to connect with the frame body through a sliding arm.

8. The head-mountable frame according to claim 7, wherein the sliding arm is arranged between the sliding outer cover and the sliding inner cover, wherein one end of the sliding arm is configured to extend out of the sliding ear arm to fixedly connect with the frame body, and wherein a plurality of limiting grooves is provided on an inner wall surface of the sliding inner cover, and the sliding arm is provided with a sliding spring sheet thereon, so that the sliding ear arm is adjustable to extend and retract along the extension direction of the frame body to be engageably received in a respective one of the limiting grooves through the sliding spring sheet, thereby restricting a position of the sliding ear arm.

9. The head-mountable frame according to claim 1, wherein the frame body comprises a head-mountable shell and a head-mountable pad provided on an inner side of the head-mountable shell, wherein the head-mountable pad is connected to the head-mountable shell through a pad support.

10. The head-mountable frame according to claim 1, wherein an elastic clamping jaw is provided in the receiving cavity for engagement with earpiece modules with different sizes.

11. The head-mountable frame according to claim 1, wherein the receiving cavity is configured as a through hole and has a mounting stop flange formed on an outer side thereof.

12. A head-mountable Bluetooth headphone, comprising:

the head-mountable frame according to claim 1; and a Bluetooth headphone module comprising a pair of earpiece modules, wherein each of the earpiece modules is removably mounted in a corresponding receiving cavity of the ear shell through press-in fit.

13. The head-mountable Bluetooth headphone according to claim 12, wherein each of the earpiece modules comprises an earpiece housing, in which a sounding assembly and a circuit board assembly are provided, and a charging port formed on the earpiece housing, wherein one end of the charging port is configured to connect with the circuit board assembly, and another end thereof is configured to extend out of the earpiece housing.

14. The head-mountable Bluetooth headphone according to claim 13, wherein the charging port is mounted in a through hole of the ear shell to position the earpiece module.

15. The head-mountable Bluetooth headphone according to claim 12, wherein the pair of earpiece modules is connected to each other through a connection cable, or in a wireless manner.

* * * * *